(No Model.)
J. TAYLOR.
Truck.
No. 241,832.  Patented May 24, 1881.
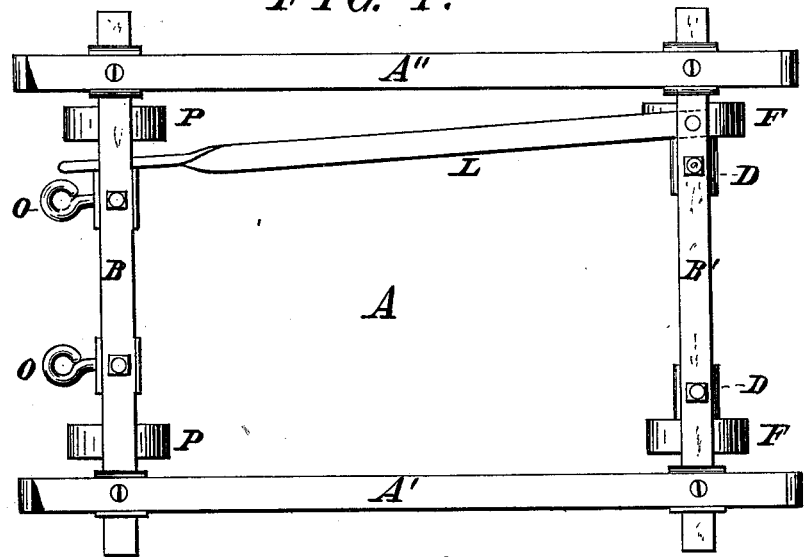
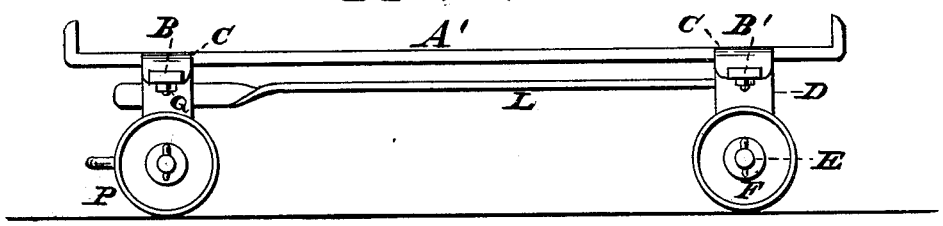
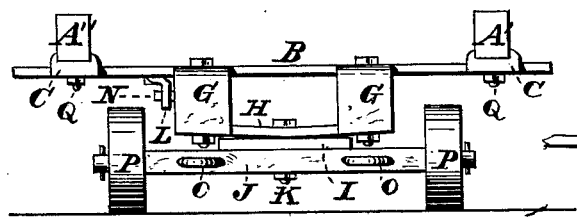
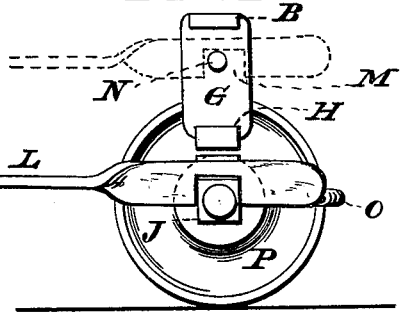
Witnesses:
Willie O. Stark
Al. Stark
Inventor:
Job Taylor,
by Michael J. Stark,
Attorney.

UNITED STATES PATENT OFFICE.

JOB TAYLOR, OF EAST HAMBURG, NEW YORK.

TRUCK.

SPECIFICATION forming part of Letters Patent No. 241,832, dated May 24, 1881.

Application filed April 7, 1881. (No model.)

*To all whom it may concern:*

Be it known that I, JOB TAYLOR, of East Hamburg, in the county of Erie and State of New York, have invented certain new and useful Improvements on a Truck; and I do hereby declare that the following description of my said invention, taken in connection with the accompanying sheet of drawings, forms a full, clear, and exact specification, which will enable others skilled in the art to which it appertains to make and use the same.

This invention has general reference to trucks for canning and packing establishments; and it consists, essentially, in the peculiar combination of parts and details of construction, as hereinafter first fully set forth and described, and then pointed out in the claims.

In the drawings already referred to, which serve to illustrate my said invention more fully, Figure 1 is a plan of my improved truck. Fig. 2 is a side elevation, and Fig. 3 a front elevation, of the same. Fig. 4 is an elevation of the forward portion of the truck, showing my improved means for locking the front axle of the same.

Like parts are designated by corresponding letters of reference in all the figures.

The object of my present invention is the production of a convenient, strong, and serviceable truck for fruit-packers' use; and it is especially designed with a view of its being readily passed into the processing-boilers, together with the fruit to be cooked.

A in the drawings represents the truck-frame. It consists of two longitudinal metallic bars, A' A'', and two transverse bars, B B', respectively, said bars being secured together by means of clips C, as clearly shown in the figures.

To the transverse bar B' are secured two blocks or supports, D D, to which, in turn, is permanently affixed the rear axle, E, carrying the rear truck-wheels, F.

To the transverse bar B are secured two blocks or supports, G G, similar to the supports D, except that they are shorter, said supports G being connected together on their lower end by a plate, H, serving, in conjunction with a similar plate, I, fixed upon the front axle, J, as a center bearing for the truck, a king-bolt, K, being passed through the two plates H I, to pivot the front axle to the truck-frame.

To the rear axle or to one of the transverse bars or to any other convenient part of the truck is secured a flat bar, L, projecting forward beyond the front axle a suitable distance. This bar L has near its forward end a notch, M, fitting the front axle, J, said notch being placed in such a position that when engaging said front axle the latter will be parallel with the rear axle, so that the truck will be capable of traveling in a straight line only.

On the block G there is a pin, N, Fig. 4, capable of engaging the notch M of the bar L, as hereinafter to be referred to.

The front axle has eyes O, wherewith engages a removable draw-bar of usual construction.

It will now be observed that if the bar L is placed into such a position that its notch M engages with the pin N (see Fig. 3) the front axle is free to be moved around the king-bolt K, so that this truck may be used as an ordinary warehouse-truck; but as soon as the bar L is pushed away from said pin N and allowed to drop, the notch M in said bar will at once engage the front axle and lock the same in a position in line or parallel with the rear axle.

This device is a very essential feature in trucks for fruit canners' and packers' use, where the truck is first used as a vehicle to be moved about the factory to gather the packed cans, and after it is loaded to be placed, together with said cans, into the so-called "processing-boilers." These boilers, I may here mention, are usually cylindrical or other receptacles having a hinged or otherwise constructed door, and a track upon which the wheels F P of the truck are constructed to run. In passing this truck into the processing-boiler it is next to impossible to push the same into proper position unless the truck has fixed axles; but such a truck would be useless in a factory to convey the goods from one place to another.

It will therefore be readily seen that my truck embodies the good and desirable qualities of both the swiveled and the non-swiveled front-axle truck, inasmuch as it can be readily converted into either the one or the other by simply engaging the bar L with or disengaging it from said front axle.

Instead of the bar L with the notch M, I may use a bar having a hook on its front end to engage either with the front axle direct or by means of an eye fixed to said front axle; or I may fasten a catch to the supports G to engage said front axle, when desired, all of which devices, as well as others, will accomplish the desired result in a manner similar to the bar L, and be therefore mechanical equivalents of the same.

I am aware that a truck having a locked front axle is not new, and I do therefore not claim, broadly, such a vehicle; but,

Having thus fully described my invention, I desire to claim as new and secure to me by Letters Patent of the United States—

1. A truck for canning and packing establishments having a swiveled front axle locked into a position parallel with the rear axle by means of a bar having a notch to engage said front axle, said truck being provided with means, substantially as described, for holding the notched bar out of the way of said front axle, substantially as described, for the object specified.

2. In warehouse and factory trucks, the combination, with a rigid rear axle, of a swiveled front axle and a bar having a notch adapted to engage said front axle and to lock the same in a position parallel with the said rear axle, as specified.

3. A warehouse-truck having the frame A composed of the longitudinal bars A' A'' and transverse bars B B', secured together by the clips C and bolts Q, blocks D, rear axle, E, blocks G, plates H and I, swiveled front axle, J, king-bolt K, and the bar L, with the notch M, one of said blocks, G, being provided with the pin N, and the whole constructed for operation substantially as and for the use and purpose indicated.

In testimony that I claim the foregoing as my invention I have hereto set my hand in the presence of two subscribing witnesses.

JOB TAYLOR.

Attest:
MICHAEL J. STARK,
JOHN C. DUERR.